Patented Mar. 25, 1947

2,418,018

UNITED STATES PATENT OFFICE

2,418,018

METHYL METHACRYLATE POLYMER LAMINATED TO A POLYVINYL BUTYRAL BY MEANS OF A SILICIC ADHESIVE

Maurice L. Ernsberger and Paul Swithin Pinkney, Wilmington, Del., assignors to E. I. du Pont de Nemours & Company, Wilmington, Del., a corporation of Delaware No Drawing. Application April 22, 1943, Serial No. 484,076

8 Claims. (Cl. 154—139)

This invention relates to adhesives for joining plastics and, more particularly, relates to polysilicic acid esters as adhesives for joining solid, oxygen-containing, organic polymers.

The increased use of organic polymeric materials in recent years in a constantly expanding number of applications has led to new demands on the manufacturers of adhesives. When different polymers are used in the same article, they must often be joined together adhesively. Many polymers, such as methyl methacrylate polymer and polyvinyl butyral resin, are surprisingly difficult to stick together. In many instances it is particularly difficult to obtain a joint between two polymers which will stand up under varied conditions of temperature, humidity and light.

An object of the present invention is to provide an improved adhesive for joining any solid, oxygen-containing, organic polymers. A further object is to provide a process of joining such polymers. A more particular object is to provide a process of laminating sheets of plastic normally difficult to adhere to each other. A specific object is to provide an improved adhesive for joining methyl methacrylate polymer to polyvinyl butyral resins. Other objects will be apparent from the description of the invention given hereinafter.

The above objects are accomplished according to the present invention by the use as an adhesive for joining solid, oxygen-containing, organic polymers, of an acid polysilicic acid ester dissolved in an organic solvent. By the term "acid polysilicic acid ester" is meant a polysilicic acid ester containing —OH groups attached to Si, the normal meaning of that term.

The invention is carried out by applying a thin film of a solution of an acid polysilicic acid ester in an organic solvent to the surfaces of the polymers to be joined and pressing these surfaces together firmly until they are securely adhered, the length of time required for this varying inversely with the temperature employed.

Preferably the solvent vehicle of the acid polysilicic acid ester adhesive composition which vehicle may be a single organic solvent or a mixture of two or more, comprises a volatile solvent and is characterized not only by being a solvent for the acid polysilicic acid ester but also by having a softening or, even better, a solvent action on the surfaces of the polymers to be joined. When the adhesive composition contains a volatile solvent, the film applied to the surfaces of the polymers is allowed to dry somewhat but before the film has dried tack free the surfaces to be joined are pressed together.

Solutions of acid polysilicic acid esters suitable for use in this invention may be prepared by contacting dissolved polysilicic acids with an esterifying agent such as a monohydric alcohol and removing water from the resulting solution as described in U. S. patent application Serial No. 439,549, filed April 18, 1940, in the name of Joseph S. Kirk and assigned to the assignee of the present application.

The more detailed practice of the present invention is illustrated by the following examples which show the use of acid polysilicic acid esters as adhesives for joining various solid, oxygen-containing, organic polymers. In Example 1, a solution of partially esterified polysilicic acids in a relatively non-volatile plasticizer-type solvent is used to join methyl methacrylate polymer to a polyvinyl butyral resin. In Example 2 the adhesive used for joining these polymers is a solution of partially esterified polysilicic acids in a mixture of volatile solvents one of which is a solvent for the organic polymers. In Example 3 the adhesive of Example 1 is used to join methyl methacrylate polymer to several additional polymeric materials. In Example 4 an ethanol solution of partially esterified polysilicic acids is used to join cellulose derivatives to vinyl polymers. In Example 5 a solution of partially esterified polysilicic acids similar to that used in Example 2 is used to join cellulose acetate to other polymeric materials. All parts are given herein by weight unless otherwise specified.

Example 1

A tributyl phosphate solution of polysilicic acids partially esterified with butanol is prepared as follows: An aqueous solution of polysilicic acids is prepared by adding 900 parts of a 15.5% solution of sodium silicate ($SiO_2$:$Na_2O$=3.25:1 by weight) to 860 parts of a vigorously stirred solution of 7% sulfuric acid over a period of ten minutes. To the resulting solution, 196 parts of tributyl phosphate and 460 parts of sodium chloride are added. Stirring is continued for one hour and then the mixture is allowed to stand for one hour. The upper, tributyl phosphate layer is separated, centrifuged, and dried over anhydrous sodium sulfate. The yield of clear, amber tributyl phosphate solution of partially esterified (by butanol formed through hydrolysis of tributyl phosphate) polysilicic acids is 122 parts. It contains 16.5% $SiO_2$; 43.9% C; 9.02% H; 8.9% P; and 3.4% free water.

Two sheets of cast methyl methacrylate polymer are coated on one side with the tributyl phosphate solution of butyl acid polysilicate. A thin sheet of plasticized polyvinyl butyral resin is coated on both sides with the same solution. The coated polyvinyl butyral resin is placed between the coated methyl methacrylate polymer surfaces and the three layers are pressed together at 150° C. for fifteen minutes under a pressure of 500 lbs./sq. in. A clear seal is obtained. Although a .22 caliber pistol bullet fired through the laminated sheet at room temperature causes the layer of methyl methacrylate polymer penetrated first to shatter and separate from the polyvinyl butyral interlayer, the other layer of methyl methacrylate polymer remains stuck to the interlayer.

*Example 2*

A predominantly butanol solution of polysilicic acids which have been partially esterified with butanol is prepared as follows from the tributyl phosphate solution described in Example 1. One volume of the tributyl phosphate solution of partially esterified polysilicic acids is diluted with 1 volume of methanol and 2.5 volumes of benzene is added rapidly with stirring. The methanol solution of partially esterified polysilicic acids which separates as a lower layer when the mixture is allowed to stand for fifteen minutes contains 50% to 60% $SiO_2$. It is separated and dissolved in a mixture of butanol and acetic acid. The final solution contains 0.5% $SiO_2$ and 20% acetic acid.

Two sheets of cast methyl methacrylate polymer are coated on one side with the butanol-acetic acid solution of acid polysilicic acid esters. A sheet of plasticized polyvinyl butyral resin is coated on both sides with the same solution. After the coatings have dried for fifteen minutes, the coated polyvinyl butyral resin is placed between the coated methyl methacrylate polymer surfaces, and the three layers are pressed together at 150° C. for fifteen minutes under a pressure of 500 lbs./sq. in. A clear seal is obtained. A .22 caliber pistol bullet shot through the laminated sheet at room temperature leaves a round hole with shattered edges and several long breaks in the layers of methyl methacrylate polymer. No more than a small wedge (a minor part of the whole sheet) of methyl methacrylate polymer separates from the polyvinyl butyral interlayer. The greater part of the laminated sheet remains one coherent piece after the shot.

*Example 3*

The tributyl phosphate solution of butyl acid polysilicates described in Example 1 is used as an adhesive in the lamination of sheets of each of the following polymeric materials between sheets of cast methyl methacrylate polymer.

(a) Ethylene/vinyl acetate interpolymer in which the ratio of ethylene to vinyl acetate is 8:1.

(b) Ethylene/vinyl acetate interpolymer in which the ratio of ethylene to vinyl acetate is 25:1.

(c) Vinyl chloride/vinyl acetate interpolymer in which the ratio of vinyl chloride to vinyl acetate is 95:5.

(d) Cellulose nitrate.

(e) N-Methoxymethylpolyhexamethyleneadipamide (10.67% N, 5.85% $CH_3O$).

The tributyl phosphate solution is applied in a thin film to one side of each of the sheets of methyl methacrylate polymer and to both sides of the interlayer polymer. The lamination is carried out at 140 to 160° C. for ten minutes under a pressure of 50 lbs. to 200 lbs./sq. in. In all cases the acid polysilicic acid esters provide a strong bond between the methyl methacrylate polymer and the polymer used as interlayer. Better adhesion is obtained with the 8:1 ethylene/vinyl acetate interpolymer than with the 25:1 ethylene/vinyl acetate interpolymer.

*Example 4*

A predominantly ethanol solution of partially esterified polysilicic acids is prepared by dissolving the concentrated methanol solution of partially esterified polysilicic acids described in Example 2 in sufficient ethanol to lower the concentration of $SiO_2$ to 5% by weight. This solution is used in the same manner as the solution of Example 3 as an adhesive in the lamination of a sheet of cellophane between sheets of unplasticized cellulose acetate, a sheet of cellophane between sheets of cast methyl methacrylate polymer, and a sheet of polyvinyl butyral resin between sheets of ethyl cellulose plasticized with dibutyl phthalate (12% based on the weight of ethyl cellulose). The coated sheets are pressed together before the acid polysilicic acid ester film has dried to a tack-free stage. They are subjected to pressures up to 2,500 lbs./sq. in. at temperatures from 100° C. to 140° C. for five to seven minutes. In all cases the acid polysilicic acid esters provide a strong bond between the laminated sheets.

*Example 5*

The acid polysilicic acid ester solution described in Example 4 is diluted with ethanol and acetic acid to obtain a solution containing 3% $SiO_2$ and 10% acetic acid. It is used in the same manner as the solution described in Example 4, as an adhesive for laminating between sheets of unplasticized cellulose acetate, sheets of (a) polyvinyl alcohol, (b) an interpolymer obtained by interpolymerization of 1 mol of ethanolamine, 1.75 mols of ethylene glycol, and 2.75 mols of adipic acid, and (c) an interpolymer obtained by interpolymerization of hexamethylenediammonium adipate, hexamethylenediammonium sebacate, and caprolactam. The laminations are carried out at 130° C. to 150° C. for five to seven minutes under pressures up to 2,000 lbs./sq. in. In all cases the acid polysilicic acid esters provide a strong bond between the cellulose acetate and the interlayer polymer.

It will be understood that the above examples are merely illustrative and that the present invention broadly comprises the use of acid polysilicic acid esters dissolved in an organic solvent as an adhesive for joining solid, oxygen-containing, organic polymers. In general, any organic solvent-soluble acid polysilicic acid ester is effective to a greater or less extent as an adhesive for joining any solid, oxygen-containing, organic polymers.

The term "oxygen-containing organic polymer" as used herein is intended to include polymers which contain more oxygen than would normally be present in the form of impurities. The oxygen content of the polymer may vary from a relatively low figure, as in an ethylene/vinyl acetate interpolymer in which the ratio of ethylene to vinyl acetate is as high as 25:1 or higher, to a relatively high figure, as in cellophane. In general, the adhesive bond obtained is stronger as the oxygen content of the polymer increases. This is illustrated by the results obtained with ethylene/vinyl acetate interpolymers in Example 3.

The oxygen in the organic polymer may be present in any of a variety of functional groups including ether, acid, ester, amide, anhydride, alcohol, ketone, and aldehyde groups. Thus, any one of the following polymers can be joined to itself or any of the others with the adhesive compositions of the present invention: coumarone resins; phenol-aldehyde resins; aldehyde resins; furfural resins; ketone resins; urea-formaldehyde type resins including thiourea-formaldehyde, melamine-formaldehyde and dicyandiamide-formaldehyde resins; sulfonamide-aldehyde resins; natural resins and their esters including rosin, shellac, and ester gum; condensation polyester resins including resins obtained from polyhydric alcohols and polybasic acids, and from hydroxy-acids; polyamide resins; mixed polyester-polyamide resins; polyether resins; polyvinyl ethers; polyvinyl esters; polyvinyl alcohols; polyvinyl acetals; polyacrylic acids, anhydrides, esters, amides, and the like; cellulose and its derivatives including wood, cellophane, and cellulose esters and ethers; and proteins, such as casein, zein, and soybean protein. These may be modified with any of the usual modifying agents including plasticizers, pigments, fillers, dyes, and materials which combine chemically with the polymer ingredients either during formation of the polymer or during an after-treatment. Thus, copolymers, interpolymers, and mixtures of polymers which comprise at least one oxygen-containing compound in chemical combination with the polymer constituents are suitable for use with the adhesive of the present invention.

In addition to the acid polysilicic acid esters prepared as described in the examples, acid polysilicic acid esters prepared by any other processes are suitable for use in this invention. These include acid polysilicic acid esters prepared as described in the following references: the above referred to application of Joseph S. Kirk; U. S. application Serial No. 439,548, filed April 18, 1942, by Ralph K. Iler and Joseph S. Kirk, also assigned to the assignee of the present application; U. S. 1,809,755; Ger. 568,545; and Ger. 696,814. The formation of a strong durable bond appears to depend on the ability of the polysilicic acid ester to polymerize further until a highly polymeric structure results. Therefore, it is necessary that it contain free silicic acid hydroxyl groups, which make possible the formation of high polymers through condensation. It may be desirable in some cases to prepare the acid polysilicic acid ester from a neutral polysilicic acid ester in situ by adding a suitable amount of water to the ester solution just before application. It is much preferred that the adhesive composition contain insufficient water to completely hydrolyze the polysilicic acid ester, since on complete hydrolysis of a silicic acid ester, a silicic acid gel or even silica is formed. These do not give a satisfactory adhesive bond.

The acid polysilicic acid esters may vary in molecular weight from esters containing only two silicon atoms per molecule to those whose molecules are of colloidal dimensions and whose sols are approaching the gel state. In general, esters of relatively low molecular weight are preferred since they are more soluble and more compatible with organic materials than are the relatively high molecular weight esters. Thus they tend to penetrate the surfaces of the organic polymers and become more strongly anchored to them.

The acid polysilicic acid esters may vary also in the ratio of silicic acid ester groups to silicon atoms from 1:60 or less to 1:1 or more. Although the solubility of the ester in organic solvents and its compatibility with organic polymers increase with increase in degree of esterification of the polysilicic acid, the ester tends to polymerize more readily at lower temperatures and in a shorter time (i. e., it forms an adhesive bond under milder conditions) as the degree of esterification is decreased. A ratio of silicic acid ester groups to silicon atoms of from 1:30 to 1:4 is preferred. The optimum degree of esterification for each particular application can readily be determined by a few preliminary tests.

The alcohol from which the acid polysilicic acid ester is derived may be primary, secondary, or tertiary, aliphatic or aromatic, cyclic or alicyclic, mono- or polyhydric, saturated or unsaturated, and straight-chain or branched-chain. It may contain additional functional groups provided such groups do not affect the stability of the acid polysilicic acid ester. Suitable functional groups include ether, halide, mercaptan, sulfide, ketone, ester, amide, nitro, and nitrile groups. In some cases acid polysilicic acid esters containing such groups may be superior to unsubstituted esters in solubility in certain organic solvents and compatibility with certain polymers. The alcohol from which the acid polysilicic acid ester is derived may vary in chain length from 1 to 8 or more carbon atoms. Although the higher chain lengths are advantageous from the point of view of the solubility of the ester in organic solvents and, within limits, its compatibility with polymers, the short-chain esters, derived from alcohols containing less than 6 carbon atoms, such as methyl, ethyl, propyl, or butyl acid polysilicates are generally preferred since they tend to form an adhesive bond under milder conditions than do the longer chain esters.

The choice of the solvent from which the acid polysilicic acid ester is applied depends on a number of variables. One is the solubility of the acid polysilicic acid ester, which varies with degree of esterification, nature of esterifying groups, and molecualr weight. The ester should, of course, be soluble in the solvent used. Another variable is the solubility of the polymer. It is preferable, although generally not necessary, to include in the acid polysilicic acid ester solution a liquid which will soften, or, even better, dissolve the surface polymer. Better anchorage of the highly polymeric silicic acid ester structure to the polymer surface is obtained in this way. Organic polymers vary widely, of course, in their solubilities, but in most cases suitable solvents or swelling agents are well known to those who are at all familiar with the resin field. In most cases a mixture of solvents including both a relatively volatile liquid and a solvent for the organic polymer is preferable. Solvents which may be found useful in this application include alcohols, ketones, esters of organic or inorganic acids, ethers, amides, and acids. Amines are not ordinarily suitable since they cause rapid gelation of acid polysilicic acid esters.

In some cases adhesion may be improved by adding a small proportion of one or more organic polymers, including one or both of the polymers to be joined or other polymers, to the acid polysilicic acid ester solution. The polymer added to the adhesive solution should preferably be compatible with the polymers to be joined.

It may in some cases be desirable to pretreat the polymer surfaces which are to be joined. Thus they may be softened or even made tacky by use of a solvent before the adhesive composition is applied. Such pretreatment assists penetration of the acid polysilicic acid ester into the polymer surface and leads to formation of a stronger bond.

The acid polysilicic acid ester is preferably applied to the surface of the polymers which are to be joined in the form of a solution in a suitable solvent as disclosed above. The solution may be applied in any suitable manner, such as by spraying, dipping, brushing, flowing, or using a doctor knife or applicator roll. The thickness of the film of ester and nonvolatile solvent can be varied by use of a volatile solvent in varying amounts. The concentration of acid polysilicic acid ester in the solution on an $SiO_2$ basis may vary from 0.1% or lower to 30% or higher, preferably from 0.5% to 15%. When the surfaces of the polymers to be joined are smooth, the more dilute solutions are usually satisfactory; when the polymer surfaces are rough, the more concentrated solutions are preferable. The optimum proportions of acid polysilicic acid ester, volatile solvent, and relatively non-volatile polymer solvent in the adhesive solution depend on the nature of each ingredient of the solution as well as on the polymer to which it is to be applied and must usually be determined for each particular case by preliminary tests. It may often be desirable, when the polymers to be joined differ widely in their solubility characteristics, to coat one with an acid polysilicic acid ester solution which differs widely in composition from that used to coat the other polymer. In some instances it may be sufficient to coat only one of the surfaces to be joined. It also may be desirable in some cases to apply the second polymer from solution.

When the adhesive solution contains a volatile solvent, it is usually preferable to allow time after application of the solution for most of the volatile solvent to evaporate. However, particularly when the degree of esterification of the polysilicic acid is low, polymerization proceeds rapidly once the solvent has evaporated and when both of the polymer surfaces to be joined are coated with the adhesive, it is important that the surfaces be pressed together before the acid polysilicic acid ester has polymerized completely. For this reason the polymer surfaces should preferably still be tacky when they are pressed together.

During formation of the adhesive bond between the polymers, the polymer surfaces must be held firmly against each other. For best results, sufficient pressure must be used to obtain good contact over the whole surface area. If the surfaces are uneven, pressures of 3,000 lbs./sq. in. or more may be necessary.

Application of heat to the polymers assists in the formation of a strong bond between them. Heat helps volatilize the remaining volatile solvents and accelerates the polymerization of the acid polysilicic acid esters. It also increases the solubility of the polymer in any solvent which the adhesive composition may contain. The softening effect of heat on thermoplastic polymers makes it easier to obtain good contact between the polymer surfaces at relatively low pressures. The temperature used may vary from room temperature to 200° C. or higher. Temperatures of from 50° C. to 150° C. are usually preferred. Discretion must be used in the application of heat and pressure, especially when the polymers are thermoplastic. For example, when change in the dimensions of the objects which are being joined is undesirable, temperatures and pressures which will cause the polymers to flow must be avoided. When the relatively non-volatile liquid component of the adhesive composition is not rapidly absorbed by one or both of the polymers, use of excessively high temperatures will sometimes lead to bubble formation, which is detrimental to adhesion as well as appearance. Since the optimum as well as the permissible conditions of temperature and pressure depend on a number of factors, it is often desirable to carry out preliminary experiments on which to base selection of the conditions to be used in each particular case.

The time required for formation of the adhesive bond decreases with increase in the temperature employed. It usually decreases also with a decrease in the degree of esterification of the polysilicic acid employed. It also depends, of course, on the other components of the adhesive composition and on the nature of the polymers between which the bond is to be formed. Usually from one to fifteen minutes is sufficient, although at relatively low temperatures a period of several hours may be required.

The adhesive of the present invention is adapted for joining polymers in a wide variety of applications. The joining of sheets of polymer together to give a laminated structure is one important specific use of this adhesive which is also adapted for joining massive pieces of polymer in the manufacture of various articles. Again, the adhesive may be used to coat a surface of a polymer and a film of another polymer may then be deposited thereon by brushing, spraying, or the like. Innumerable uses of this adhesive will be obvious to those skilled in the art.

An advantage of the present invention is that it provides a practical and economical means of joining solid, oxygen-containing, organic polymers to each other with a strong bond. A further advantage is that the present adhesive can be used to join transparent polymers since it results in a transparent film at the joint; this is particularly valuable with respect to the manufacture of transparent laminated sheet structures. Another advantage of the present invention is that it gives rise to a bond between two polymers which is substantially unaffected by varied conditions of temperature, humidity, and light, and is not weakened with the passage of time.

As many apparently widely different embodiments of this invention may be made without departing from the spirit and scope thereof, it is to be understood that the invention is not limited to the specific embodiments thereof except as defined in the appended claims.

We claim:

1. A laminated article comprising a sheet of methyl methacrylate polymer and a sheet of a polyvinyl butyral resin, said two sheets being joined together by an adhesive comprising an acid polysilicic acid ester.

2. An article comprising a piece of methyl methacrylate polymer and a piece of a polyvinyl butyral resin joined together, said pieces having been joined together by coating at least one face of one of said pieces with a solution of an acid polysilicic acid ester in an organic solvent and pressing the two pieces together with the coated surface of one of said pieces adjacent to a face of the other of said pieces.

3. An article comprising a piece of methyl methacrylate polymer and a piece of a polyvinyl butyral resin joined together, said pieces having been joined together by coating at least one face of one of said pieces with a solution of an acid silicic acid ester in a solvent vehicle comprising an organic solvent having at least a softening effect on said piece, and pressing the two pieces together with the coated surface of one of said pieces adjacent to a face of the other of said pieces.

4. An article comprising a piece of methyl methacrylate polymer and a piece of a polyvinyl butyral resin joined together by an adhesive comprising an acid polysilicic acid ester.

5. Process of joining a piece of methyl methacrylate polymer and a piece of a polyvinyl butyral resin which comprises coating at least one face of one of said pieces with a solution of an acid polysilicic acid ester in which the ratio of silicic acid ester groups to silicon atoms is from 1:30 to 1:4, in an organic solvent and pressing the two pieces together with the coated surface of one of said pieces adjacent to a face of the other of said pieces.

6. Process of joining a piece of methyl methacrylate polymer and a piece of a polyvinyl butyral resin which comprises coating at least one face of one of said pieces with a solution of an acid polysilicic acid ester of an alcohol containing less than 6 carbon atoms and in which ester the ratio of silicic acid ester groups to silicon atoms is from 1:30 to 1:4, in an organic solvent and pressing the two pieces together with the coated surface of one of said pieces adjacent to a face of the other of said pieces.

7. Process of joining a piece of methyl methacrylate polymer and a piece of a polyvinyl butyral resin which comprises coating at least one face of one of said pieces with a solution of an acid polysilicic acid ester of an alcohol containing 4 carbon atoms and in which ester the ratio of silicic acid ester groups to silicon atoms is from 1:30 to 1:4, in an organic solvent and pressing the two pieces together with the coated surface of one of said pieces adjacent to a face of the other of said pieces.

8. Process of joining a piece of methyl methacrylate polymer and a piece of a polyvinyl butyral resin which comprises coating at least one face of one of said pieces with a solution of an n-butyl acid polysilicate in which the ratio of silicic acid ester groups to silicon atoms is from 1:30 to 1:4, in a solvent vehicle comprising tributyl phosphate, and pressing the two pieces together with the coated surface of one of said pieces adjacent to a face of the other of said pieces.

MAURICE L. ERNSBERGER.
PAUL SWITHIN PINKNEY.

REFERENCES CITED

The following references are of record in the file of this patent:

UNITED STATES PATENTS

| Number | Name | Date |
| --- | --- | --- |
| 1,809,755 | King | June 9, 1931 |
| 2,258,218 | Rochow | Oct. 7, 1941 |
| 2,317,891 | Dennison | Apr. 27, 1943 |

FOREIGN PATENTS

| Number | Country | Date |
| --- | --- | --- |
| 157,688 | Austrian | Jan. 10, 1940 |

OTHER REFERENCES

Andreanou (1), Org. Chem. Industry, U. S. S. R. 6, pages 203–7 (1939).

Andreanou (2), Jour. Gen. Chem. U. S. S. R. 8, pages 1255–62 (1938).

(Copies of the above pages from the respective publications are available in Division 50 of this office.)